United States Patent [19]

Burmeister

[11] Patent Number: 4,730,893

[45] Date of Patent: Mar. 15, 1988

[54] SUPPORT ASSEMBLY FOR LIGHT WAVEGUIDE COUPLINGS

[75] Inventor: Klaus-Dieter Burmeister, Munich, Fed. Rep. of Germany

[73] Assignee: Siemens Aktiengesellschaft, Berlin and Munich, Fed. Rep. of Germany

[21] Appl. No.: 871,202

[22] Filed: Jun. 5, 1986

[30] Foreign Application Priority Data

Jul. 26, 1985 [DE] Fed. Rep. of Germany ....... 3526843
Jul. 26, 1985 [DE] Fed. Rep. of Germany ....... 3526854
Jul. 26, 1985 [DE] Fed. Rep. of Germany ....... 3526853

[51] Int. Cl.⁴ .............................................. G02B 6/36
[52] U.S. Cl. .............................. 350/96.22; 350/96.10; 350/96.20
[58] Field of Search ................. 350/96.20, 96.21, 96.22

[56] References Cited

U.S. PATENT DOCUMENTS

| | | | |
|---|---|---|---|
| 4,124,271 | 11/1978 | Green | 350/96.22 X |
| 4,193,661 | 3/1980 | d'Auria et al. | 350/96.22 X |
| 4,319,951 | 3/1982 | Korbelak et al. | 350/96.22 X |
| 4,568,143 | 2/1986 | Yamada et al. | 350/96.20 |
| 4,653,850 | 3/1987 | Boirat et al. | 350/96.22 |

FOREIGN PATENT DOCUMENTS 8109413 7/1981 Fed. Rep. of Germany .
3235723 3/1984 Fed. Rep. of Germany .

*Primary Examiner*—William L. Sikes
*Assistant Examiner*—Akm E. Ullah
*Attorney, Agent, or Firm*—Jeffrey P. Morris

[57] ABSTRACT

A flat panel-shaped waveguide support assembly (1) possesses couplings (3), which are for coupling together incoming and outgoing light waveguides (4,5). Light waveguides (4) are divided into two partial bundles which are guided along opposite sides of the support assembly. From here they are semi-circularly led to an opposite semi-row of couplings (3) so that the two waveguide bundles cross over one another. Thus a relatively large bending radius of curvature is provided while still permitting compact dimensions for the support assembly (1).

3 Claims, 3 Drawing Figures

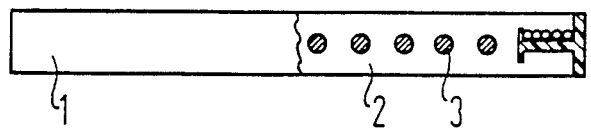
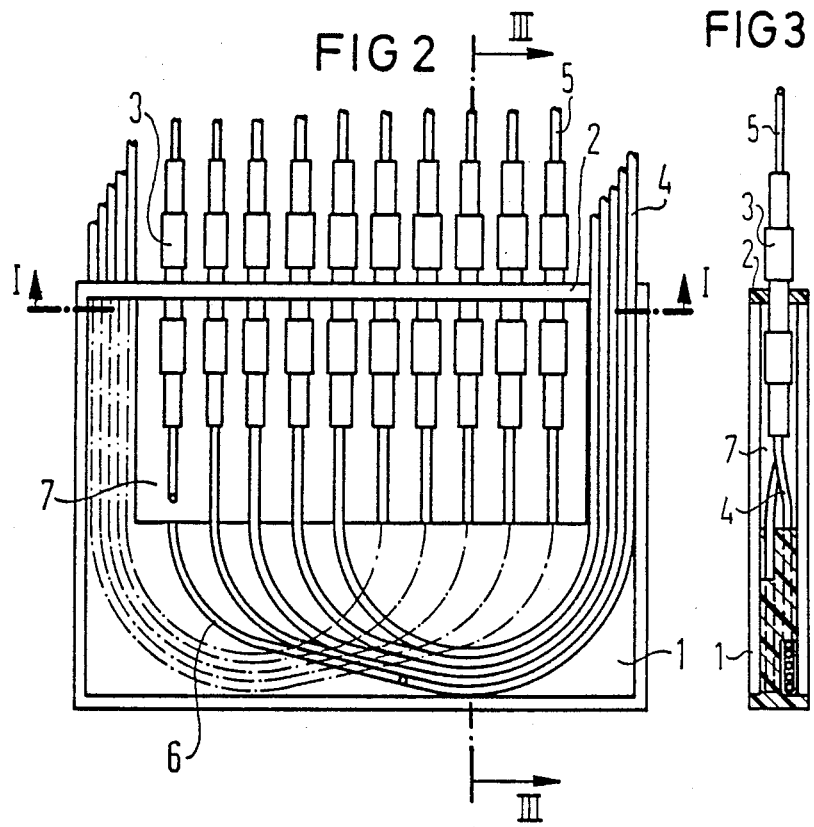

SUPPORT ASSEMBLY FOR LIGHT WAVEGUIDE COUPLINGS

BACKGROUND OF THE INVENTION

1. Field of the Invention

The invention relates generally to the field of waveguide terminal assemblies and more particularly to a flat panel shaped support assembly for couplings of light waveguides, into which incoming and outgoing light waveguides are led in an arched fashion and connected and which are arranged beside one another in rows parallel to the plane of the support assembly.

2. Description of the Prior Art

A waveguide support assembly for couplings of light waveguides is disclosed in German Pat. No. 32 35 723 and another is disclosed in German industrial design 81 09 413. In accordance therewith the incoming lines are laid so as to be loop-shaped in the terminating region of the support assembly and branch off to the individual couplings from an appropriate point.

SUMMARY OF THE INVENTION

The object of the present invention consists in reducing the size of the support assembly while providing that the radius of curvature of the associated light waveguides is as large as possible.

In particular, there is a division, for example, of the incoming lines into two separately guided bundles which allows the individual light waveguides to be led to two semi-rows without any counter-curvature. Consequently, the present support assembly may be very compact without the associated waveguides having to be bent below their minimum radius of bending. A branching of the two bundles also results in improved clarity and a smooth conductor guidance which facilitates the function of the assembly.

Additionally the waveguide course is largely optimized by the particularly small outer dimensions of the support which permit favorable radii of curvature for the waveguide.

A clear spatial separation of two semi-bundles is obtained so that mutual hindrance among the waveguides during the assembly operations is reduced.

A further development of the invention allows a very flat planar design of the present support assembly because the couplings only slightly protrude from the surface of the front panel of the support assembly.

The light waveguides are evenly guided over their entire length by means of grooved channels, so that the danger of over bending is largely avoided.

In the following discussion, the invention will be further explained making reference to an exemplary embodiment which is illustrated in the drawings.

BRIEF DESCRIPTION OF THE DRAWINGS

FIGS. 1 and 2 illustrate a lateral view and a plan view respectively of a waveguide support assembly with couplings for light waveguides and light waveguides shown connected thereto; FIG. 1 illustrates a partial cross-section along the line I—I shown in FIG. 2.

FIG. 3 is a cross-section along the line III—III shown in FIG. 2.

DETAILED DESCRIPTION OF THE DRAWINGS

In FIGS. 1, 2 and 3, an essentially flat panel-shaped waveguide support assembly 1 is shown with a cross-piece 2, to which couplings 3 of light waveguides 4, 5 are secured. The same reference numerals are used in both FIGS. 1 and 2 to denote similar elements. The couplings 3 are arranged in a row beside one another, parallel to the plane of the support assembly 1. Incoming light waveguides 4 are divided into two bundles which are led to the support assembly 1 from both sides of the couplings 3 and in the longitudinal direction thereof. The two partial bundles are secured to the support assembly 1 on both sides of the latter. In their end section the incoming light waveguides 4 are bent backwards towards themselves so as to be semi-circular and then led to the couplings 3. Outgoing light waveguides 5 are connected to the opposite side of the couplings 3. The incoming light waveguides 4 are respectively led to half of the couplings 3 which are arranged opposite another respective partial bundle. The two bundles of waveguides cross over in the central lower region of the support assembly 1, as seen clearly in FIG. 2.

Grooved channels 6, wherein the end sections of the incoming light waveguides 4 are accurately led, are provided in the upper and lower surfaces of the support assembly 1 in accordance with the course of the conductor ends. In the region of the couplings 3, the carrier component 1 possesses a large-area opening 7 which extends considerably beyond the ends of the couplings 3. The sleeve-shaped couplings 3 have their central axis arrange in the central plane of the carrier component 1, so that they only slightly protrude from the planar surface of the assembly. Thus a very flat design of the support assembly 1 is allowed. Moreover, the two partial bundles of the incoming light waveguides 4 can be led to the couplings 3 with negligible deflection at right angles to the planar surface of the assembly. The length of the opening 7 ensures that the couplings 3 may be assembled without obstruction or hindrance.

In order to secure the ends of the light waveguides 4 in the channels 6 it is expedient to secure them by an adhesive foil or plate (not shown) at the peak of their curvature.

Thus, there has been shown and described a novel waveguide support assembly whose scope of invention should only be deemed to be limited by the claims which follow.

What is claimed is:

1. A flat panel-shaped support assembly for couplings of light waveguides, into which assembly incoming and outgoing light waveguides are hung in loops and connected arranged in rows parallel to the plane of the support assembly, said incoming light waveguides are branched into two separate bundles which are separately guided on the support assembly such that one of said bundles is connected to a semi-row of couplings and the other of said bundles is connected to the other semi-row of couplings, whereby the light wavegides of the two bundles are guided to the couplings from different sides of the support assembly, and such that the two bundles are guided along opposite plate-like longitudinal sides of the support assembly and semi-circularly extend to a respectively opposite semi-row of couplings in a mirror-inverted fashion and cross one another, and further wherein the support assembly includes a large-area opening in the central region between the opposite sides through which opening the conductors of at least one of said bundles are led to a respective semi-row of couplings.

2. A support assembly in accordance with claim 1, wherein in the region of the large-area opening the couplings are arranged approximately in the center of the plane of the support assembly and are secured to a cross-piece of the support assembly.

3. A support assembly in accordance with claim 1, wherein the support assembly includes grooved channels wherein individual incoming light waveguides are guided.

* * * * *